United States Patent [19]
Maillefer

[11] Patent Number: 4,543,051
[45] Date of Patent: Sep. 24, 1985

[54] SIZING DEVICE FOR EXTRUDED PLASTIC TUBING

[75] Inventor: Charles E. Maillefer, Buchillon, Switzerland

[73] Assignee: Maillefer S.A., Ecublens, Switzerland

[21] Appl. No.: 449,787

[22] Filed: Dec. 14, 1982

[30] Foreign Application Priority Data

Dec. 21, 1981 [CH] Switzerland .................. 8165/81

[51] Int. Cl.⁴ .................. B29D 23/04; B29F 3/08
[52] U.S. Cl. .................. 425/71; 264/178 R; 264/562; 264/566; 264/568; 425/325; 425/326.1; 425/388
[58] Field of Search .................. 425/71, 97, 325, 388, 425/326.1; 264/178 R, 209.3, 560, 566, 568, 562, 209.4

[56] References Cited

U.S. PATENT DOCUMENTS

| | | | |
|---|---|---|---|
| 3,378,887 | 4/1968 | Reib et al. | 264/560 |
| 3,546,745 | 12/1970 | Ball | 13/14 |
| 3,668,288 | 6/1972 | Takahashi | 264/209.4 |
| 3,717,426 | 2/1973 | Tucking et al. | 425/71 |
| 3,804,567 | 4/1974 | Recknagel | 425/71 |
| 3,804,574 | 4/1974 | Gatto | 425/325 |
| 3,851,028 | 11/1974 | Beyer | 264/209.3 |
| 3,963,403 | 6/1976 | Hughes et al. | 425/325 |
| 4,029,452 | 6/1977 | Schippers et al. | 425/325 |
| 4,154,563 | 5/1979 | Johnson | 425/325 |
| 4,181,487 | 1/1980 | Kessler | 425/388 |
| 4,411,613 | 10/1983 | Gauchel et al. | 264/560 |

FOREIGN PATENT DOCUMENTS

| | | | |
|---|---|---|---|
| 756072 | 3/1971 | Belgium | 425/71 |
| 2456986 | 6/1976 | Fed. Rep. of Germany . | |
| 7620107 | 10/1976 | Fed. Rep. of Germany . | |
| 2610972 | 9/1977 | Fed. Rep. of Germany | 264/209.4 |
| 2086713 | 12/1971 | France . | |
| 49-31544 | 8/1974 | Japan | 425/71 |
| 611549 | 6/1979 | Switzerland . | |
| 1202961 | 8/1970 | United Kingdom | 425/71 |
| 532530 | 4/1977 | U.S.S.R. | 425/325 |

Primary Examiner—Jeffery Thurlow
Attorney, Agent, or Firm—Parkhurst & Oliff

[57] ABSTRACT

A vat under vacuum bears in its sidewall a sizing sleeve, the cylindrical downstream portion of which includes annular channels interconnected by distribution channels. Injection ducts leave the bottoms of the annular channels and open out in the inside surface of the sleeve. The interior of the sleeve communicates with the interior of the vat via rows of radial suction ducts. During operation, the injection ducts are supplied with water under pressure which forms a film between the outside of the tubing and the inside surface of the sleeve even when the tubing is pressed against that inside surface owing to the partial vacuum prevailing within the vat.

9 Claims, 1 Drawing Figure

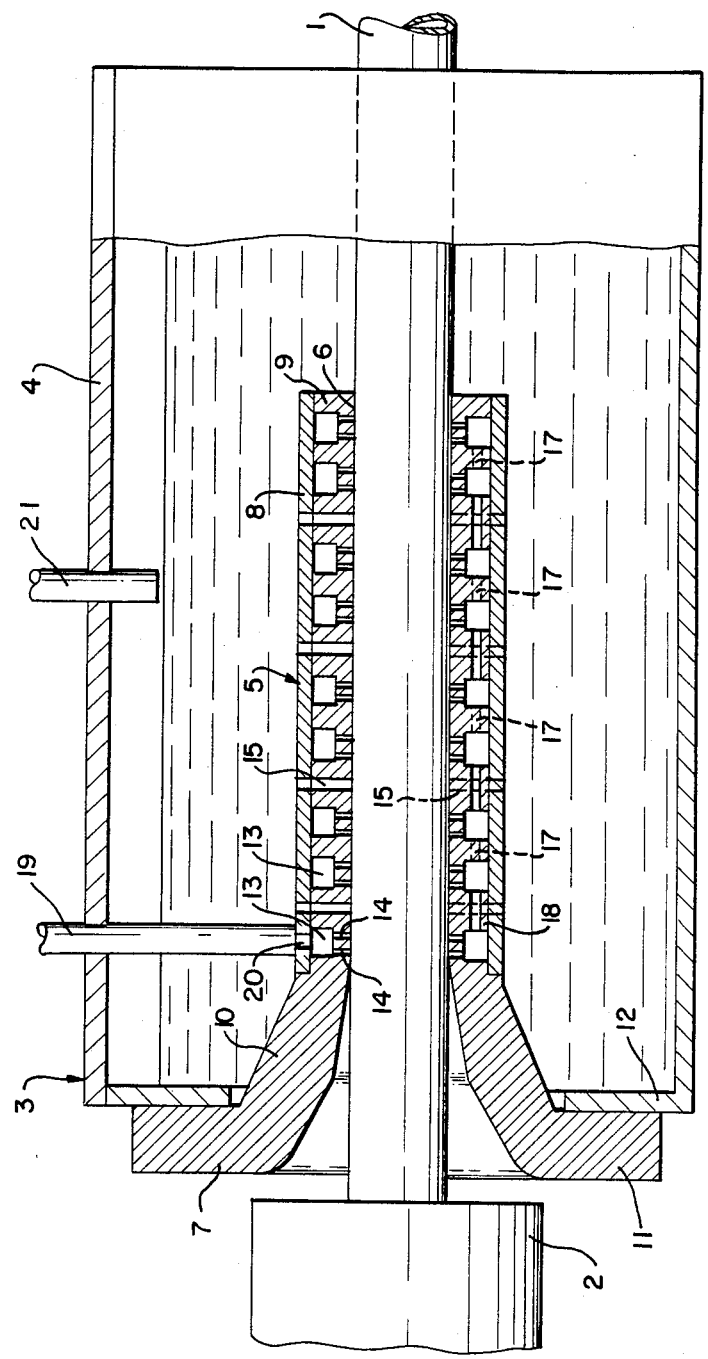

SIZING DEVICE FOR EXTRUDED PLASTIC TUBING

This invention relates to devices for sizing tubes made of plastic material produced by extrusion, and more particularly to a device of the type comprising a sizing sleeve placed in a vat containing a cooling liquid maintained at negative pressure, and a distribution network supplied with water under pressure so as to maintain a flow between the outer wall of the tube and the inner surface of the sizing sleeve.

Sizing devices are used in the manufacture by extrusion of tubing of plastic material which must meet precise specifications as regards its outside diameter. In general, the tube passes through a sizing sleeve upon leaving the extruder. The production of these sizing devices encounters difficulties with certain materials of which the tubing is made, these materials having the property of being adhesive at high temperatures so that there is a risk of the plastic tubing material adhering partially to the inside surface of the sizing sleeve.

Conventional sizing devices utilize a metal sleeve, the inside diameter of which corresponds to the desired outside diameter of the tubing, and which has radial ducts passing all the way through it. This sleeve is disposed within a cooling vat containing water. The vat is often completely closed, with suction piping maintaining the interior at negative pressure. Thus the sleeve is cooled by the liquid in the vat, and the wall of the tubing is flattened against the inner surface of the sleeve owing to the negative pressure transmitted through the radial ducts.

In order to overcome the difficulties mentioned above, Swiss Pat. No. 611,549 provides for a set of nozzles disposed at the outer end of the sizing sleeve. However, this solution has been found to be inadequate inasmuch as it does not allow the final diameter of the tubing to be determined accurately enough, the layer of liquid drawn along between the inside surface of the sleeve and the tubing being excessively thick.

U.S. Pat. No. 3,546,745 describes a sizing sleeve wherein the coolant supply means comprise circular grooves communicating with the inner surface of the sleeve by means of inlet gaps. This inner surface includes threads, between which helical paths conduct the water from the distribution gaps to other, circular outlet gaps connected to vacuum means.

French Published Application No. 2,086,713 also discloses a sleeve having supply means opening out on the inside surface through grooves or annular slots.

Experience has shown, however, that the gaps, slots, or other openings formed by such prior art supply means in the inside surface of the sleeve have an unfavorable effect upon the surface condition of the tubing obtained in the extrusion head.

It is an object of this invention to provide an improved sizing device which avoids the drawbacks mentioned above and yields not only precise sizing but also a smooth, uniform tubing surface even when the tubing material is of the kind likely to stick to the sizing sleeve.

To this end, in the device for sizing extruded plastic tubes according to the present invention, of the type initially mentioned, the sizing sleeve has a smooth inside surface, the shape and dimensions of which match the cross-section of the tube, and the distribution network includes a set of injection ducts crossing the sleeve between a supply duct and the inner surface of the sleeve, these injection ducts being sufficiently long and fine to create a pressure-drop in the water passing through them, so that this pressure-drop forms between the inner surface of the sleeve and the tube a continuous film at a pressure lower than the supply pressure.

A preferred embodiment of the invention will now be described in detail with reference to the accompanying drawing, which is a diagrammatic longitudinal section through the sizing device.

The drawing shows a tube 1, made of a plastic material such as flexible PVC, leaving at extrusion temperature an extrusion head 2 fixed to the end of a conventional extruder. Head 2 itself is of a usual design and need not be described. Immediately downstream from head 2, tube 1 enters a cooling vat 3 in which it is cooled and solidified. Vat 3 is closed by a cover 4. A sizing sleeve 5, fixed in an opening in the upstream sidewall 12 of vat 3, comprises a circular cylindrical inside surface 6, the diameter of which matches the intended outside diameter of tube 1. Sleeve 5 is made up of two tubular parts: a sleeve body 7 and a casing 8. Body 7 comprises a relatively long, cylindrical downstream portion 9 and a funnel-shaped upstream portion 10, and it ends in a flat, annular flange 11 by which the whole sleeve 5 can be fixed against sidewall 12 of vat 3.

Downstream portion 9 of sleeve body 7 has a series of annular grooves 13 machined in its cylindrical outer surface. In the bottom of each groove 13, of rectangular cross-section, are two rows of radial injection ducts 14 opening out in the cylindrical inside surface 6 of body 7. In the embodiment illustrated in the drawing, there are an odd number of grooves 13 and double rows of ducts 14, so that starting from the upstream end of portion 9, we find a first annular channel 13, then, downstream from this first channel, four pairs of channels 13 delimited and separated from one another by groups of ducts 15 distributed around body 7 and passing all the way through it radially.

Tubular closure part 8 is fitted on body 7 and, as may be seen in the drawing, closes the various channels 13 toward the outside. Radial ducts 15 pass through tubular part 8 as well and thereby cause inside surface 6 of sleeve 5 to communicate with the interior of vat 3.

Whereas the two channels 13 of each pair are joined by a short longitudinal communication channel 17 within the wall of body 7, other longitudinal ducts 18, likewise disposed within the wall of body 7 but angularly offset relative to ducts 17, join the downstream channel 13 of each pair of annular channels to the upstream channel 13 of the following pair. Thus, all the channels 13 are interconnected in series and can be supplied from a feed pipe 19 connected to an aperture 20 in part 8.

The device being described also comprises a suction pipe 21 which passes through cover 4 for creating a negative pressure within vat 3. It will be seen that the length of pipe 21 also makes it possible to regulate the contents of vat 3; for if the coolant level in vat 3 rises above the end of pipe 21, the excess is drawn off by the pump which keeps the vat at negative pressure.

When in operation, the sizing device in the present embodiment is fed with a liquid coolant under pressure, e.g., water, entering sleeve 5 through pipe 19. This pressurized water can circulate in the various channels 13 and supply the injection ducts 14. The length and diameter of ducts 14 are predetermined in such a way that a pressure-drop exists in the flow of water passing through them, so that this water reaches the level of inside surface 6 substantially at atmospheric pressure. On the other hand, as the pressure at the mouths of ducts 15 in surface 6 is the internal pressure prevailing within vat 3, the water issuing out on that surface through the mouths of ducts 14 forms a thin film between the outside surface of tube 1 and the inside surface 6 of sleeve 5 and flows toward the nearest duct 15. Because of the chosen arrangement, each row of ducts 15 collects the film of water formed from the rows of injection ducts 14 which are fed by the two adjacent channels 13, i.e., the ones situated on each side of that row of ducts 15. The flow of the last annular channel 13, however, is toward the downstream end of sleeve 5, without its being necessary for this water to pass through suction ducts.

Thus the sizer described above makes it possible not only to draw the tubing against the inside surface of the sizing sleeve, as in the usual sleeves incorporated in vacuum vats, but also to inject cold water under pressure between the cylindrical wall of the sleeve and the plastic tubing under such conditions that a film of liquid facilitating the sliding of the tubing within the sizer is created.

A secondary effect of the arrangement described is that cooling of the tubing is greatly enhanced by the direct contact between the film of cold water and the hot plastic. The heat is carried off by convection owing to the circulation of the film of water and not just by conduction through the wall of the sleeve, as has previously been the case.

In a modified version of the embodiment, instead of having ducts 15 pass radially all the way through the sleeve, their outer ends might open out into collectors which would be connected to other suction means independently of the vat.

Another advantage of the device described is that the higher pressure of the film relative to the pressure prevailing within the vat can be adjusted to the desired value since injection ducts 14 are fine, relatively long ducts, therefore causing an appreciable drop in pressure. Owing to this possibility of precise adjustment, the rate of flow of the pressurized water which forms the film can be very low.

This latter advantage leads to another: it is possible to introduce products for reducing the pH of the water supplied through pipe 19 without incurring any great expense for this treatment of the make-up water.

Finally, the plastic tubing running through the sleeve is cooled under absolutely uniform conditions while undergoing a hydrostatic supporting effect. Hence it does not come in contact with the metal of the sleeve.

What is claimed is:

1. A device for sizing tubing of plastic material produced by extrusion, said device comprising:
   a vat containing a liquid coolant,
   a sleeve having a cooling and sizing portion disposed in said vat within said coolant,
   a passage extending longitudinally through said portion of said sleeve,
   first conduit means within said portion of said sleeve for supplying further liquid coolant to said passage, and
   second conduit means within said portion of said sleeve for sucking said further liquid coolant from said passage,
   said passage being defined by a smooth inside surface of said portion of said sleeve having a constant tubular cross-sectional shape and matching the cross-sectional shape and area of said tubing,
   said first and second conduit means respectively comprising first and second individual radial ducts which open directly into said smooth inside surface, said first radial ducts having predetermined length and diameter, and said first and second radial ducts being alternatingly longitudinally distributed along said portion of said sleeve to maintain a continuous film of said further liquid coolant between said smooth inside surface and said tubing.

2. The device of claim 1, wherein said negative pressure source comprises one or more collectors, said second radial ducts being divided into groups of ducts distributed over the circumference of said portion of said sleeve and connected to said collectors.

3. The device of claim 2, wherein said vat comprises a sidewall, said sleeve comprising at one end thereof an entry cone fixed against said sidewall.

4. The device of claim 1, wherein said first conduit means further comprises a plurality of channels embedded within said portion of said sleeve and connected to said first radial ducts.

5. The device of claim 4, wherein said first conduit means further comprises a plurality of annular channels spaced from one another along said portion of said sleeve, said first radial ducts extending radially from said annular channels to said inside surface, and a plurality of longitudinal channels interconnecting said annular channels.

6. The device of claim 1, wherein said first radial ducts are sufficiently long and fine to create a pressure drop in said further liquid coolant passing therethrough, said first conduit means being connected to a source of said further liquid coolant under pressure,
   said second conduit means being connected to a negative pressure source,
   wherein said source of further liquid coolant under pressure, said negative pressure source and said first conduit means are so designed as to maintain said continuous film at substantially atmospheric pressure.

7. The device of claim 1, wherein said second conduit means interconnect said passage and said liquid coolant in said vat, and said negative pressure source comprises means for maintaining negative pressure within said vat.

8. The device of claim 1, wherein said second conduit means comprises groups of said second radial ducts distributed around the circumference of and passing completely through said portion of said sleeve.

9. The device of claim 1, wherein a plurality of longitudinal channels interconnects said first radial ducts.

* * * * *